United States Patent
Ko et al.

(10) Patent No.: US 10,591,272 B2
(45) Date of Patent: Mar. 17, 2020

(54) STRAIN SENSOR WITH IMPROVED SENSITIVITY

(71) Applicant: Gwangju Institute of Science and Technology, Gwangju (KR)

(72) Inventors: Heung Cho Ko, Gwangju (KR); Yun Jeong Heo, Gwangju (KR); Young Kyu Hwang, Gwangju (KR)

(73) Assignee: GWANGJU INSTITUTE OF SCIENCE AND TECHNOLOGY, Buk-Gu, Gwangju (KR)

( * ) Notice: Subject to any disclaimer, the term of this patent is extended or adjusted under 35 U.S.C. 154(b) by 116 days.

(21) Appl. No.: 15/756,197

(22) PCT Filed: Sep. 1, 2016

(86) PCT No.: PCT/KR2016/009788
§ 371 (c)(1),
(2) Date: Feb. 28, 2018

(87) PCT Pub. No.: WO2017/039350
PCT Pub. Date: Mar. 9, 2017

(65) Prior Publication Data
US 2018/0292196 A1    Oct. 11, 2018

(30) Foreign Application Priority Data
Sep. 1, 2015 (KR) ......................... 10-2015-0123713

(51) Int. Cl.
*G01B 7/00*  (2006.01)
*G01B 7/16*  (2006.01)

(52) U.S. Cl.
CPC ................. *G01B 7/18* (2013.01); *G01B 7/22* (2013.01)

(58) Field of Classification Search
CPC .................................... G01B 7/18; G01B 7/22
(Continued)

(56) References Cited

U.S. PATENT DOCUMENTS 4,622,706 A * 11/1986 Takeuchi ........... A61G 7/05776
                                                              5/713
10,263,131 B2 *  4/2019 Aiken ................. H01L 31/0504
(Continued)

FOREIGN PATENT DOCUMENTS

KR    10-2009-0056883 A    6/2009
KR    10-2001-0082465 A    7/2011

OTHER PUBLICATIONS

International Search Report (PCT/ISA/210) dated Dec. 2, 2016, by the Korean Intellectual Property Office as the International Searching Authority for International Application No. PCT/KR2016/009788.

(Continued)

*Primary Examiner* — Max H Noori
(74) *Attorney, Agent, or Firm* — Buchanan Ingersoll & Rooney PC (57) ABSTRACT

A deformation sensing sensor as disclosed includes a conductive material inside the body thereof such that, by sensing a change in resistance or capacitance resulting from a deformation, a degree of deformation of the measurement object can be detected. The body includes an elastic layer, which has a corrugation formed on one surface thereof, and a conductive layer, which is formed on the other surface of the elastic layer using a conductive material. When the body is deformed in the lateral direction of the surface on which the corrugation is formed, the change in resistance of the conductive layer before and after the deformation, or the change in capacitance thereof is measured, thereby detecting the degree of deformation of the measurement object.

13 Claims, 7 Drawing Sheets

(58) Field of Classification Search
USPC .......................................................... 73/774
See application file for complete search history.

(56) References Cited

U.S. PATENT DOCUMENTS

| | | | | |
|---|---|---|---|---|
| 2003/0030452 | A1* | 2/2003 | Okada | G01L 1/142 |
| | | | | 324/681 |
| 2004/0061687 | A1 | 4/2004 | Kent et al. | |
| 2004/0210285 | A1* | 10/2004 | Yon | A61F 7/12 |
| | | | | 607/105 |
| 2006/0238517 | A1 | 10/2006 | King et al. | |
| 2007/0097073 | A1 | 5/2007 | Takashima et al. | |
| 2008/0245434 | A1* | 10/2008 | Hibino | F16L 11/112 |
| | | | | 138/121 |
| 2009/0140996 | A1 | 6/2009 | Takashima et al. | |
| 2010/0229923 | A1* | 9/2010 | Frolov | H01L 31/0392 |
| | | | | 136/251 |
| 2011/0026233 | A1* | 2/2011 | Hong | H01B 13/008 |
| | | | | 361/784 |

OTHER PUBLICATIONS

Written Opinion (PCT/ISA/237) dated Dec. 2, 2016, by the Korean Intellectual Property Office as the International Searching Authority for International Application No. PCT/KR2016/009788.

* cited by examiner

STRAIN SENSOR WITH IMPROVED SENSITIVITY

TECHNICAL FIELD

The present invention relates to a strain sensor, and more specifically, to a strain sensor with improved strain sensitivity to detect strain even when a strain range is small.

BACKGROUND ART

A strain sensor means a sensor which detects physical change such as tension, bending, or twisting applied to the sensor, and is applicable to various kinds of industries using characteristics of detecting such physical change. The strain sensor is available for a motion sensor which detects motion change of fingers and toes, a smart sportswear which can detect quantity of motion, shrinkage and relaxation of body joints and muscles at the time of exercise, and the like. As well as detection of human motion, it is available in various fields of manufacturing a large-area strain sensor array, a microcrack detector of device equipment, and the like through adjustment of specification and sensitivity.

As a commercialized strain sensor, there is a sensor using a metal thin film, and it is possible to detect strain by measuring resistance change generated by physical change applied to metal. Generally, a metal resistance wire with high resistivity is fixed onto an insulation substrate, a lead wire connected to a terminal is adhered to one side or both sides of a measurement object by an adhesive, and strain of the object is converted by measuring electrical resistance. Recently, there are many cases of using, instead of a resistance wire, a resistance foil as the same kind of alloy, and this is referred as a metal resistance foil strain gauge. As for the strain sensor using a metal thin film, it is difficult to embody a large area due to the nature thereof, and it is difficult to utilize the strain sensor as a sensor which detects human motion due to low sensitivity. In addition, the conventional strain sensor has a disadvantage that an error of a detection result according to a speed of strain occurrence is large.

Such a strain sensor using a metal thin film can be used only in a strain range equal to or less than about 3%, and a gauge constant (G) representing sensitivity is about 2. Meanwhile, in the human body, an elbow and a knee are strained maximally about 50%, a wrist, an ankle, or a neck is strained maximally about 20%, and a finger nodule is strained maximally about 30%. Since the conventional strain sensor using a metal thin film has a detection range of 3% or less, there is a limit to be used for a device wearing on or attached to the body.

The description as the background art is only to promote understanding of the background of the invention, and it should not be accepted as recognition of corresponding to the prior art already known to persons skilled in the art.

The description as the background art is only to promote understanding of the background of the invention, and it should not be accepted as recognition of corresponding to the prior art already known to persons skilled in the art.

SUMMARY OF INVENTION

Technical Problem

The invention has been made to solve such problems, and an object of the invention is to provide a strain sensor with improved sensitivity according to strain degree as well as measuring a strain range of a joint portion of the human body with a relatively large strain range.

Solution to Problem

According to the invention, there is provided a strain sensor which includes a conductive material in a body thereof to detect a strain degree of a measurement target by sensing change in resistance or capacitance based on strain, wherein the body includes an elastic layer which is provided with unevenness on one surface thereof, and a conductive layer which is formed on the other surface of the elastic layer by a conductive material, and wherein when the body is strained in a side direction of the surface provided with the unevenness, change in resistance or capacitance of the conductive layer before and after strain is measured to detect a strain degree of the measurement target.

According to the invention, there is provided a strain sensor which includes a conductive material in a body thereof to detect a strain degree of a measurement target by sensing change in resistance or capacitance based on strain, wherein the body includes a first elastic layer, a conductive layer which is formed on the first elastic layer by a conductive material, and a second elastic layer which is formed on the conductive layer and is provided with unevenness on an exposed surface thereof to generate change in thickness, and wherein when the body is strained in a side direction of the surface provided with the unevenness, change in resistance or capacitance of the conductive layer before and after strain is measured to detect a strain degree of the measurement target.

According to the invention, there is provided a strain sensor which includes a conductive material in a body thereof to detect a strain degree of a measurement target by sensing change in resistance or capacitance based on strain, wherein the body is an elastic body having a conductive material uniformly distributed therein, is provided with unevenness on one surface thereof, and is provided with electrodes attached to both sides of the surface of the body provided with the unevenness, and wherein when the body is strained in a side direction of the surface provided with the unevenness, change in resistance or capacitance between the electrodes before and after strain is measured to detect a strain degree of the measurement target.

The unevenness may include ridges and valleys, and a ratio of ridge and valley in width may be (width of valley):(width of ridge)=1:1 to 1:6.

The unevenness may include ridges and valleys, and a ratio of ridge and valley in height may be (height of valley):(height of ridge)=1:4/3 to 1:3.

The elastic body may include at least one of PDMS, epoxy, and Ecoflex.

The conductive material may include at least one of silver nanowire, carbon nanotube, carbon black, graphene, and metal powder.

Advantageous Effects of Invention

According to the strain sensor with improved sensitivity according to the invention, it is possible to measure a strain range of a joint portion of the human body with a relatively large strain range, it is possible to adjust a strain range measurable by the strain sensor and sensitivity by adjusting depth, width, and the like of unevenness formed on the surface thereof, and the strain sensor can be utilized in various fields such as monitoring of bio-signals or input devices of machine.

DESCRIPTION OF EMBODIMENTS

Technical terms used herein are merely to mention a specific embodiment, and do not intend limiting the present invention. Singular forms used therein include plural forms as long as they do not represent the meanings clearly opposite thereto. The meaning of "including" used in the specification specifies specific characteristics, areas, integers, steps, operations, elements, and/or components, and does not exclude existence or addition of other specific characteristics, areas, integers, steps, operations, elements, components, and/or groups.

Although not defined differently, all terms including technical terms and science terms used herein have the same meaning generally understood by persons skilled in the art. The terms defined in generally used dictionaries are additionally interpreted as having meaning corresponding to related technical documents and current description, and are not interpreted as ideal or very public meaning unless defined.

Hereinafter, a strain sensor according to a preferred embodiment of the invention will be described with reference to the accompanying drawings.

The invention relates to a strain sensor which is provided with an unevenness structure on the surface thereof to more effectively adjust sensitivity and a strain range than a general flat-type sensor. The strain sensor is to detect human body motion of fingers, toes, and the like sensitively moved in a narrow range, or motion of knees, elbows, and the like moved in a wide range, by using the same material. Accordingly, the strain sensor according to the present invention is a device which includes a conductive material in a body thereof, and detects strain through change in resistance or change in capacitance by the strain, and is provided with unevenness on the surface thereof, and the thickness is changed by valleys and ridges formed by the unevenness.

Figure 1:
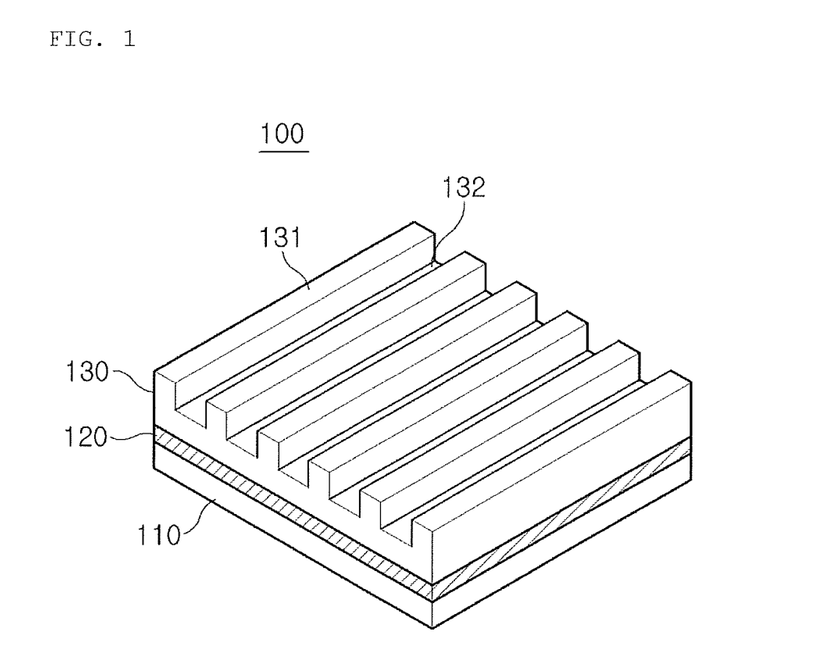
FIG. 1 is a perspective view illustrating a strain sensor according to an embodiment of the present invention.

FIG. 1 is a perspective view illustrating a strain sensor according to an embodiment of the present invention. Referring to FIG. 1, a strain sensor 100 according to an embodiment of the present invention may include a first elastic layer 110, a conductive layer 120, and a second elastic layer 130.

Basically, the strain sensor 100 is provided with an unevenness structure on one surface of the second elastic layer 130, is provided with the conductive layer 120 on the other surface, measures change in resistance or change in capacitance of the conductive layer 120 before and after strain to detect a strain degree of a measurement target when the surface provided with the unevenness structure is strained (elongation and contraction) in a side direction of the surface provided with the unevenness structure. The first elastic layer 110 corresponds to a configuration added to protect the conductive layer 120 exposed outside. The first elastic layer 110 and the second elastic layer 130 constitute a basic body portion of the strain sensor 100. The conductive layer 120 is positioned between the first elastic layer 110 and the second elastic layer 130. The first elastic layer 110 and the second elastic layer corresponding to the body portion correspond to a portion capable of adjusting a strain range of the strain sensor.

The most critical part of the invention is to form the unevenness structure on the surface of the second elastic layer 130 such that the thickness of the strain sensor is varied along a strain direction. Accordingly, even when the first elastic layer 110 is not provided, it can be operated as a strain sensor. The second elastic layer 130 may be formed of unevenness by ridges 131 and valleys 132. The ridge portion 131 corresponds to a thick portion of the strain sensor, and the valley portion 132 corresponds to a thin portion of the strain sensor. As compared with a flat-type strain sensor formed with the same thickness as the thickness of the valley portion, when there is the same strain, the flat-type strain sensor is strained uniformly overall, but the unevenness-type strain sensor is strained intensively on the valley portions. Accordingly, the strain is larger than strain of the flat-type strain sensor with the same thickness, and a resistance change rate is increased thereby. The sensor which detects strain by using this can increase sensitivity thereof.

By appropriately selecting materials corresponding to the first elastic layer 110 and the second elastic layer 130, it is possible to design a strain sensor capable of measuring a specific strain range according to an elastic strain range of each material. The materials used in the elastic layer 110 and the second elastic layer 130 may be various materials, and may include at least one of polydimethylsioxane (PDMS), epoxy, and Ecoflex.

Particularly, polydimethylsioxane (PDMS) is configured with silicon and oxygen, and is called silicon rubber or inorganic polymer. The PDMS is a material having a simple manufacturing method, and high transparency and elasticity, has advantages such as gas permeability, low price, and non-toxic, and is appropriately used as a material of the elastic layer in the embodiment of the invention.

Epoxy is formed by curing epoxy resin to form an elastic body, and has advantages of excellent heat resistance, hygroscopic, insulation resistance, high frequency characteristic, and the like. However, flexibility thereof is decreased in accordance with a curing degree, and use may be limited when a strain range is large.

Ecoflex is complete biodegradable plastic based on fossil fuel developed by BASF Corporation, Germany, and is a material widely used in a vinyl or film form as resin for packing food in the past. When such Ecoflex is used as a material of the elastic layer, utilization of a strain sensor of a wearable device used for a human body is high due to an eco-friendly material.

Meanwhile, a conductive material forming the conductive layer 120 may be a material in which change in resistance occurs or change in capacitance occurs by strain, and may include at least one of silver nanowire, carbon nanotube, carbon black, graphene, and metal powder.

A material used for a conductive layer is a material in which resistance is changed by strain, and a silver nanowire is most commonly used. Carbon-based carbon nanotube, carbon black, graphene, and the like are materials most actively studied in recent, and the conductive layer may be formed of such materials in a film form. Although it is preferable to form the conductive layer in a form in which metal powder is uniformly distributed, the conductive layer may be manufactured and used in a film form with a predetermined thickness by sintering metal powder.

Particularly, in the case of carbon nanotube, it is possible to embody a two-dimensional bipolar strain sensor capable of measuring even size and directionality of strain by using bipolarity in which an electrical resistance value of the conductive layer using carbon nanotube is changed in the opposite aspect in accordance with the direction of strain.

In addition, graphene is a two-dimensional material made of carbon atoms, has a honeycomb structure, and is a material which becomes graphite when stacked three-dimensionally, becomes carbon nanotube when rolled one-dimensionally, and becomes a buckyball when made in a zero-dimensional ball shape. Graphene is structurally or chemically very stable, and represents charge mobility higher than silicon 100 times or more. Graphene can manufacture a transparent conductive film by transferring a sheet, and can manufacture a transparent thin film device.

The unevenness includes ridges and valleys, and a ratio of ridge and valley in width (width of valley):(width of ridge)=1:1 to 1:6 is preferable.

As the width of ridge gets wider, a part occupied by valleys in the overall sensor gets smaller, and sensitivity of the overall sensor is improved. Out of the above range, a degree of improvement of sensitivity is minimal, thus the range is preferable.

In addition, the unevenness includes ridges and valleys, and a ratio of ridge and valley in height (height of valley):(height of ridge)=1:4/3 to 1:3 is preferable. As difference between ridge and valley gets larger, a strain rate of a part of valleys is increased, and thus a resistance change rate is also increased. In other words, sensitivity of the overall sensor is improved. Out of the above range, a degree of improvement of sensitivity is minimal, thus the range is preferable.

Figure 2:
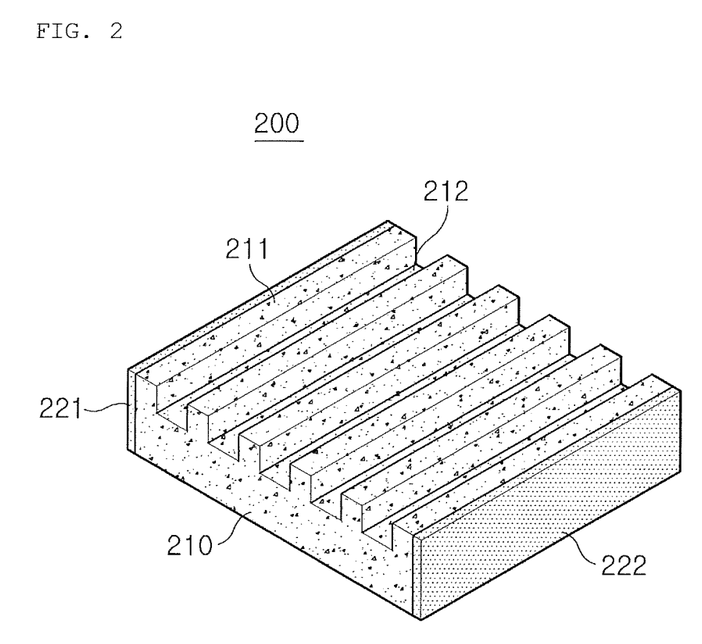
FIG. 2 is a perspective view illustrating a strain sensor according to another embodiment of the present invention.
Figure 3:
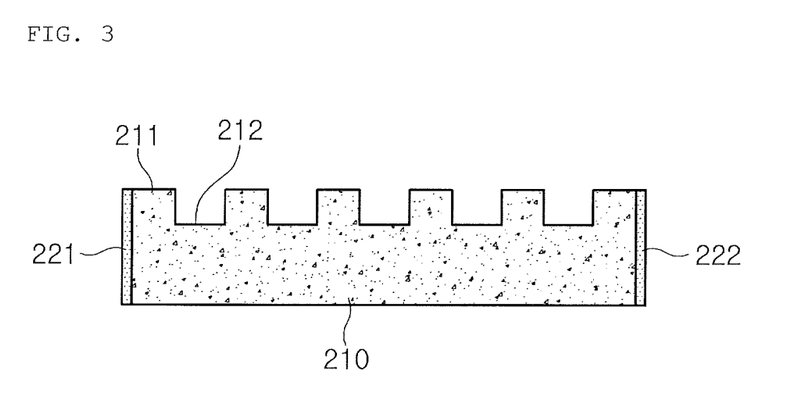
FIG. 3 is a cross-sectional view illustrating a strain sensor according to another embodiment of the present invention.

FIG. 2 is a perspective view illustrating a strain sensor according to another embodiment of the invention. FIG. 3 is a cross-sectional view illustrating a strain sensor according to another embodiment of the invention. Referring to FIG. 2 and FIG. 3, a strain sensor 200 according to another embodiment of the invention may be provided with a conductive material to be uniformly distributed in an elastic body, in which a body is not divided into an elastic layer and a conductive layer, differently from the embodiment described above. In order to measure strain in a side direction of the surface provided with unevenness, electrodes 221 and 222 are attached to the side. An object of the present invention is to use a phenomenon of increasing strain more than a flat-type strain sensor with no unevenness when strain occurs in a side direction, by forming unevenness on the surface of the elastic layer. Accordingly, in the embodiment, when the electrodes 221 and 222 are attached to the upper and lower portions of unevenness, the object of the present invention described above cannot be achieved. In other words, when strain occurs in a side direction, it is possible to measure a strain degree of a measurement target by measuring change in resistance or change in capacitance between the electrodes 221 and 222. Such a strain sensor 200 has an advantage of simple manufacturing since it is possible to omit a process of forming a separate layer, differently from the above embodiment. In addition, unevenness may be formed by ridges 211 and valleys 212 like the above embodiment. Basically, the strain sensor 200 is an elastic body having a conductive material uniformly distributed therein, is provided with unevenness on one surface thereof, and includes electrodes 221 and 222 which are attached to the body 210 and the side of the surface provided with unevenness. The strain sensor 200 measures change in resistance or change in capacitance between the electrodes 221 and 222 before and after strain to detect a strain degree of a measurement target when the surface provided with the unevenness structure is strained (elongation and contraction) in a side direction of the surface provided with the unevenness structure.

The key point in the embodiment is to form the unevenness structure on the surface of the body 210 such that the thickness of the strain sensor is varied along a strain direction. One surface of the body 210 may be formed of ridges 211 and valleys 212. The ridge portion 211 corresponds to a thick portion of the strain sensor, and the valley portion 212 corresponds to a thin portion of the strain sensor. As compared with a flat-type strain sensor formed with the same thickness as the thickness of the valley portion 212, when there is the same strain, the flat-type strain sensor is strained uniformly overall, but the unevenness-type strain sensor is strained intensively on the valley portions. Accordingly, the strain is larger than strain of the flat-type strain sensor with the same thickness, and a resistance change rate is increased thereby. The sensor which detects strain by using this can increase sensitivity thereof.

Hereinafter, specimens corresponding to Example and Comparative Example were manufactured, and the present invention will be described in more detail with reference to a tensile test result.

Figure 4:
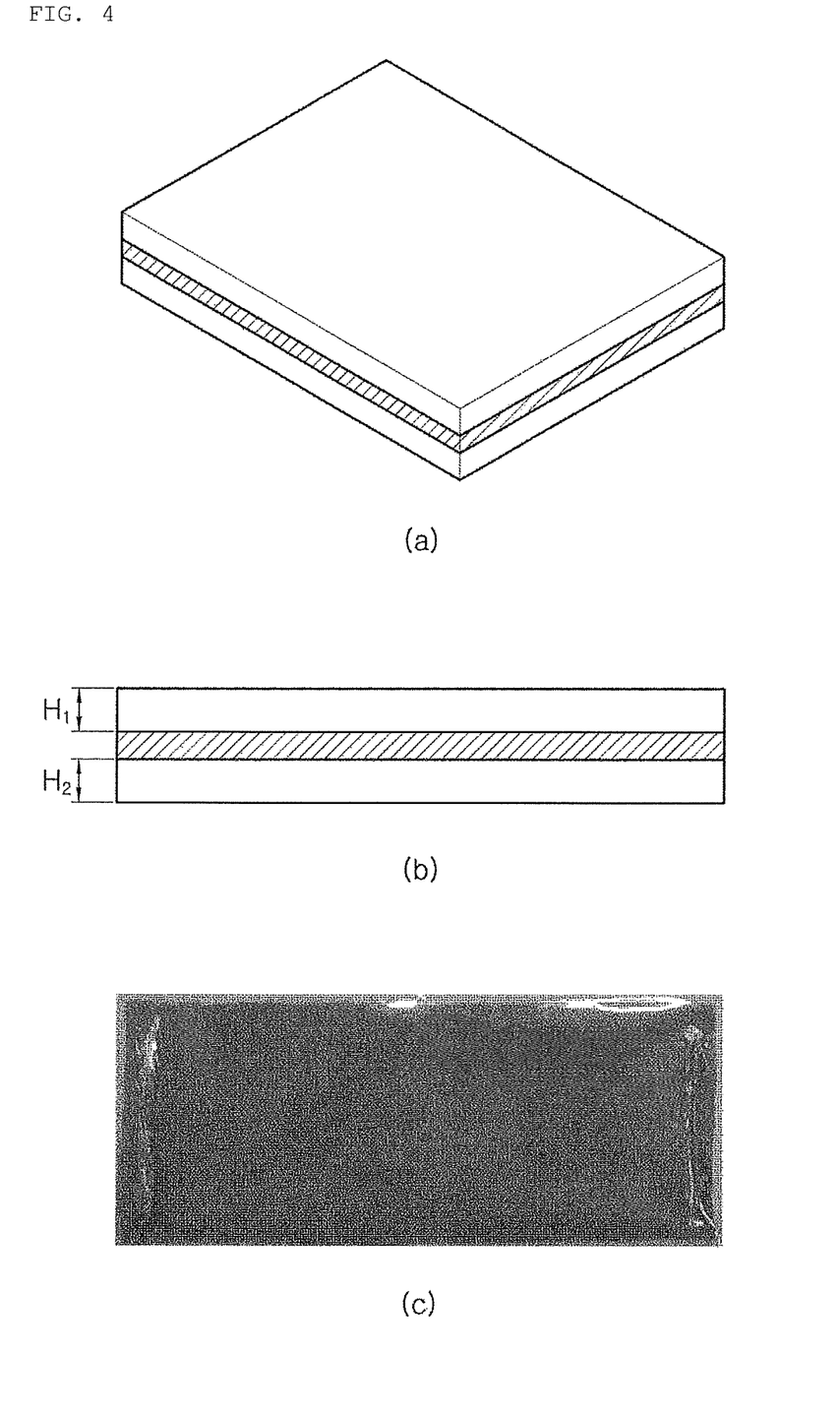
FIG. 4 is a schematic diagram illustrating a flat-type strain sensor used in Experimental Example of the present invention.
Figure 5:
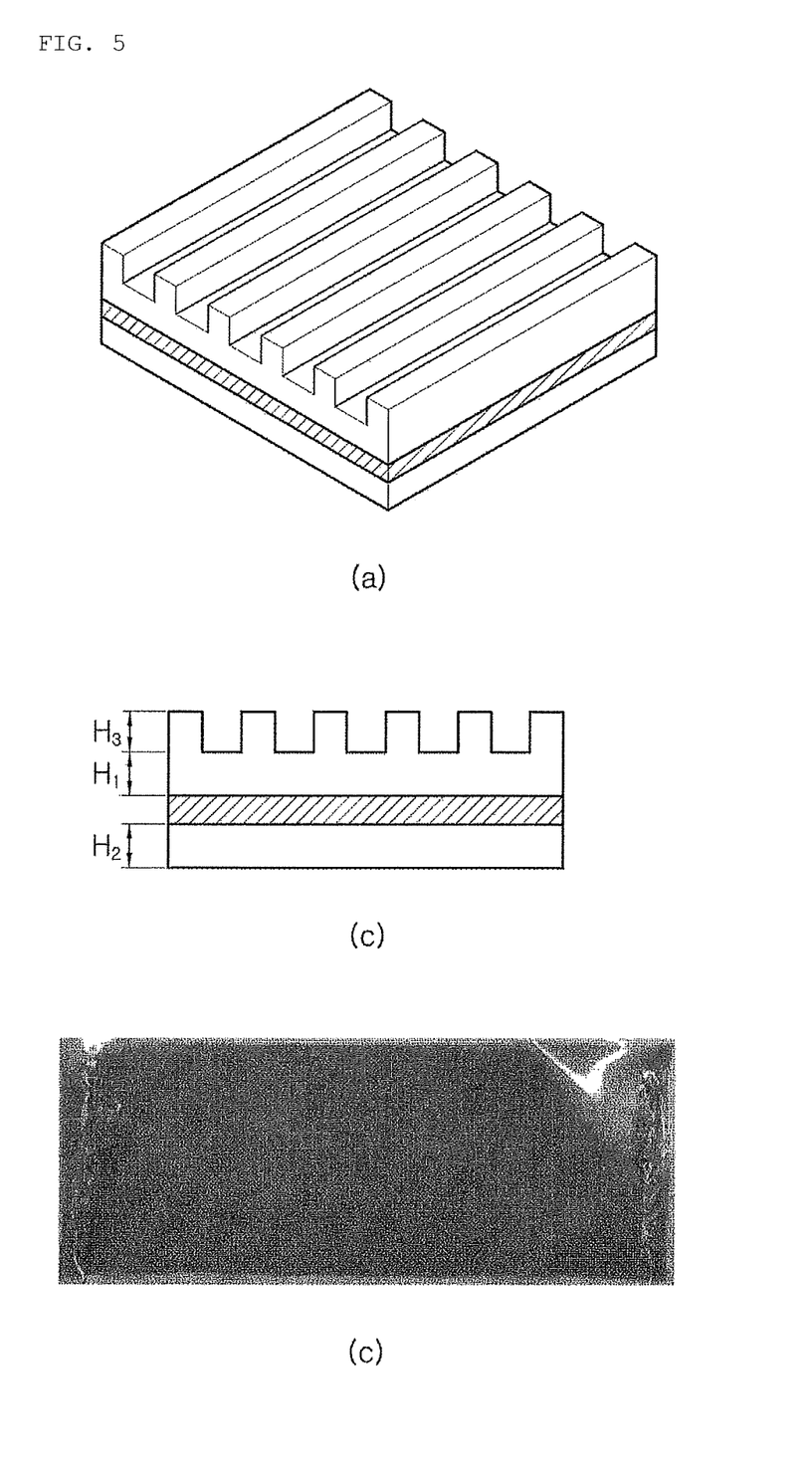
FIG. 5 is a schematic diagram illustrating an unevenness-type strain sensor used in Experimental Example of the present invention.
Figure 6:
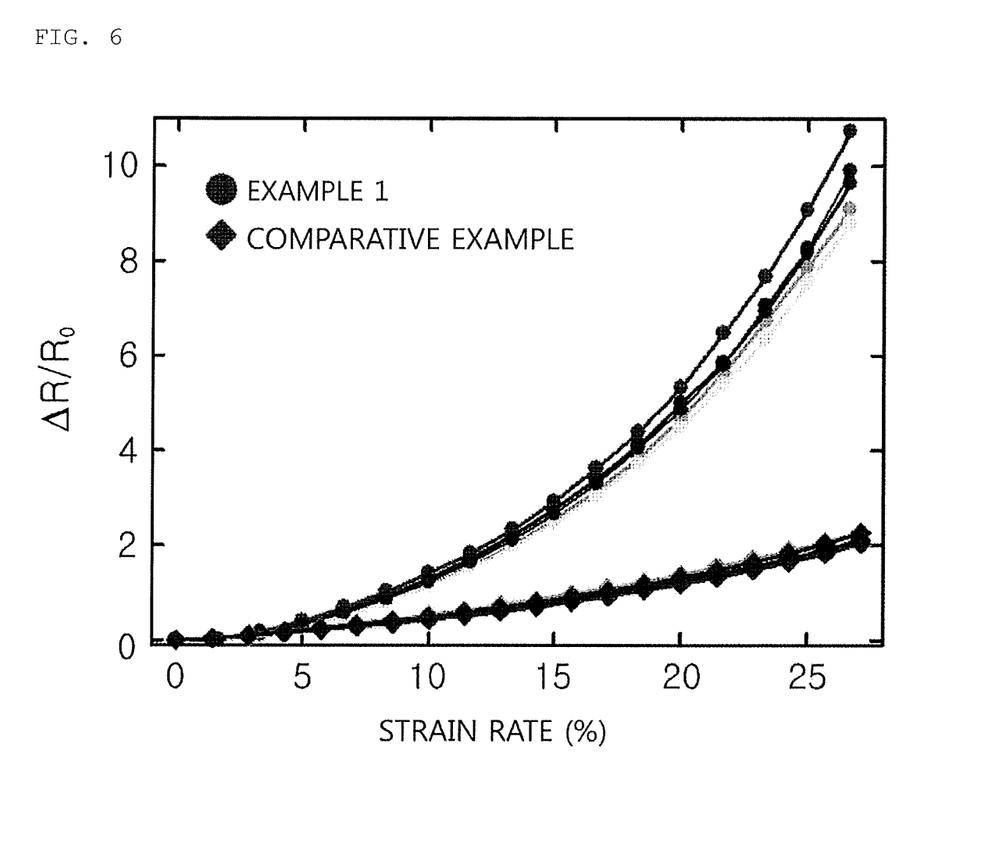
FIG. 6 is a graph illustrating resistance change rates depending on strain of Example and Comparative Example in Experimental Example of the present invention.

FIG. 4 is a schematic diagram illustrating a flat-type strain sensor used in Experimental Example of the present invention. FIG. 5 is a schematic diagram illustrating an unevenness-type strain sensor used in Experimental Example of the present invention. FIG. 6 is a graph illustrating resistance change rates depending on strain of Example and Comparative Example in Experimental Example of the present invention. Referring to FIG. 4 to FIG. 6, a strain degree and stress change of a strain sensor according to an embodiment of the present invention will be described by comparison with a flat-type strain sensor.

As illustrated in FIG. 4, a flat-type strain sensor was manufactured as Comparative Example. In this case, the flat-type strain sensor was manufactured by spin-coating PDMS on a glass substrate, coating a silver nanowire to form a conductive layer, and then spin-coating PDMS again. The thickness of the illustrated conductive layer is exaggeratedly expressed to display the thickness, and an actual thickness is about a sub-micro unit. In the height of the elastic body formed in this case, the height ($H_2$) of the lower portion of the conductive layer is 100 μm, and the height ($H_1$) of the upper portion of the conductive layer is 50 μm.

As illustrated in FIG. 5, a strain sensor with an unevenness structure was manufactured as Example. In this case, the unevenness-type strain sensor was manufactured by forming a pattern corresponding to unevenness by using SU-8 photoresist, coating PDMS thereon to form a second elastic layer, coating a silver nanowire thereon to form a conductive layer, and then spin-coating PDMS again. The thickness of the illustrated conductive layer is exaggeratedly expressed to display the thickness, and an actual thickness is about a sub-micro unit.

A strain rate and acting stress of the strain sensor were measured while changing the widths of the valley portion and the ridge portion and the height of the ridge portion of the strain sensor manufactured in such a manner. A tensile test of the flat-type strain sensor and the unevenness-type strain sensor was performed such that a strain rate of the overall strain sensor was 28% and, in this case, a result of measuring a strain rate and stress while changing the heights of the ridge portion and the valley portion of the unevenness-type strain sensor is represented in Table 1. In this case, a ratio of the valley portion and the ridge portion in width is 1:2.5.

TABLE 1

| Classi-fication | $H_1$ (μm) | $H_2$ (μm) | $H_3$ (μm) | Strain Rate (%) | | Stress (N/m²) | |
|---|---|---|---|---|---|---|---|
| | | | | Valley | Ridge | Valley | Ridge |
| Example 1 | 50 | 100 | 50 | 34 | 26 | $1.44 \times 10^6$ | $1.08 \times 10^6$ |
| Example 2 | 50 | 100 | 100 | 40 | 24 | $1.66 \times 10^6$ | $9.88 \times 10^5$ |
| Example 3 | 50 | 100 | 150 | 44 | 22 | $1.84 \times 10^6$ | $9.14 \times 10^5$ |
| Example 4 | 50 | 100 | 200 | 48 | 20 | $1.99 \times 10^6$ | $8.49 \times 10^5$ |
| Example 5 | 50 | 100 | 250 | 51 | 19 | $2.12 \times 10^6$ | $7.92 \times 10^5$ |

As illustrated in Table 1, as the height corresponding to the ridge portion gets larger, stress is further concentrated on the valley portion, and the strain rate is increased more than the overall strain rate. On the contrary, the strain rate of the ridge portion is gradually decreased. However, in the case of the flat-type strain sensor, the strain rate is constantly 28%, and the resistance change rate is determined according thereto. However, in the case of unevenness-type strain sensor, strain is concentrated on the valley portion. Accordingly, even when the strain rate is 28%, the resistance change rate measured in this case is larger than the resistance change rate of the flat-type strain sensor. As described above, the fact that the resistance change rate is measured as being large in the same strain range means that sensitivity of the strain sensor is improved.

As illustrated in FIG. 6, comparing the resistance change rates according to the strain rate between the unevenness-type strain sensor corresponding to Example 1 and the flat-type strain sensor corresponding to Comparative Example, it can be confirmed that the resistance change rate in the case of Example 1 is larger even in the same strain rate. In other words, it can be known that the sensitivity is further improved as compared with the flat-type strain sensor in the same strain rate by forming the unevenness structure.

In addition, a strain rate and acting stress were measured while changing the width of the ridge portion of the strain sensor. A tensile test of the flat-type strain sensor and the unevenness-type strain sensor was performed such that a strain rate of the overall strain sensor was 28% and, in this case, a result of measuring a strain rate and stress while changing the widths of the ridge portion and the valley portion of the unevenness-type strain sensor is represented in Table 2. In this case, the height of the ridge portion is 50 μm.

The width of the valley portion is A, the width of the ridge portion is B, and the total length of the strain sensor is A+B.

TABLE 2

| Classi-fication | (Valley Width):(Ridge Width) = A:B | Strain Rate (%) | | Stress (N/m²) | |
|---|---|---|---|---|---|
| | | Valley | Ridge | Valley | Ridge |
| Example 6 | 1:1 | 32.7 | 24.4 | $1.36 \times 10^6$ | $1.01 \times 10^6$ |
| Example 7 | 1:2.5 | 34.8 | 26.0 | $1.44 \times 10^6$ | $1.08 \times 10^6$ |

TABLE 2-continued

| Classi-fication | (Valley Width):(Ridge Width) = A:B | Strain Rate (%) | | Stress (N/m²) | |
|---|---|---|---|---|---|
| | | Valley | Ridge | Valley | Ridge |
| Example 8 | 1:3 | 35.2 | 26.3 | $1.46 \times 10^6$ | $1.09 \times 10^6$ |
| Example 9 | 1:4 | 35.7 | 26.7 | $1.48 \times 10^6$ | $1.11 \times 10^6$ |
| Example 10 | 1:6 | 36.4 | 27.2 | $1.51 \times 10^6$ | $1.13 \times 10^6$ |

As illustrated in FIG. 2, as the width of the ridge portion gets larger, stress is concentrated on the valley portion, and the strain rate of the valley portion is increased more than the overall strain rate. As the width of the ridge portion gets larger, the width of the valley portion gets smaller. Accordingly, in order that the overall strain rate is 28%, the strain rate of the ridge portion is increased. Accordingly, the resistance change rate is changed according to the change in width, and sensitivity is improved.

Figure 7:
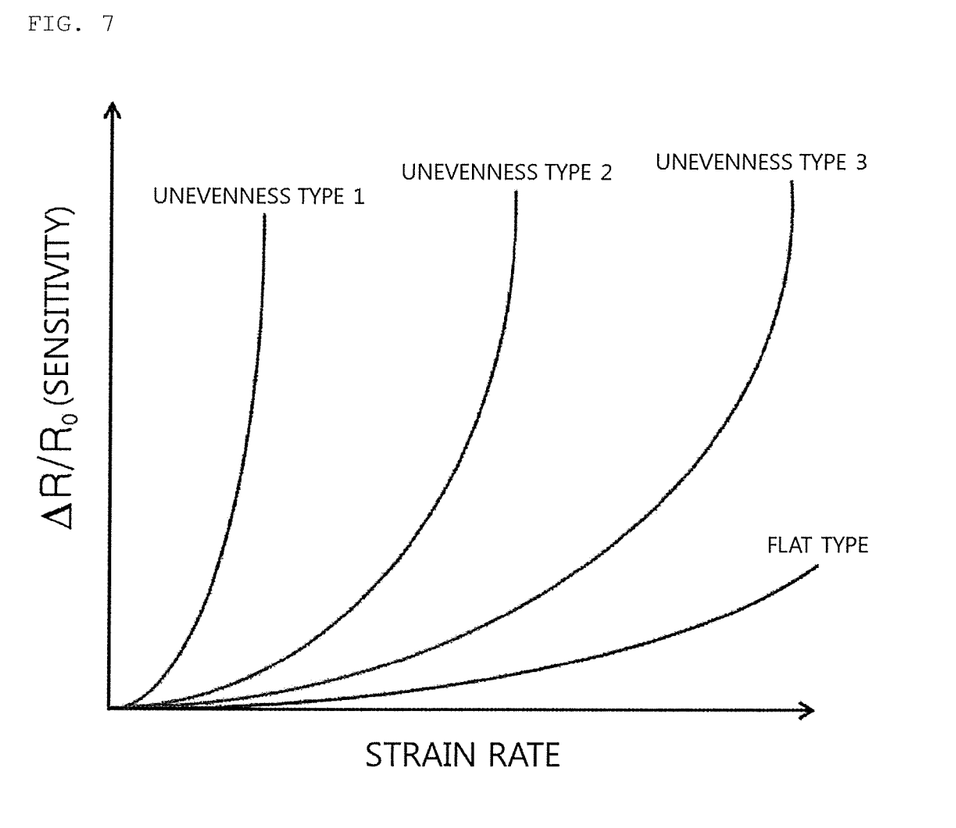
FIG. 7 is a graph illustrating a strain range and sensitivity obtainable by adjusting the strain sensor according to the present invention.

FIG. 7 is a graph illustrating a strain range and sensitivity obtainable by adjusting the strain sensor according to the present invention. As illustrated in FIG. 6, it is possible to design the strain sensor to correspond to the strain rate applied by adjusting a type, a ratio of width, and a ratio of thickness of the unevenness structure even in the same material of the strain sensor provided with the unevenness structure according to the present invention. For example, the case of an unevenness type 1 corresponds to a strain sensor used in a place having a low strain rate, in which sensitivity is improved. Sequentially, an unevenness type 2 and an unevenness type 3 correspond to strain sensors in which a range of a strain rate applied is gradually raised.

The embodiments of the invention have been described above with reference to the accompanying drawings, but persons skilled in the art can understand that the invention may be carried out by other specific embodiments without changing technical spirits or essential features.

Therefore, it should be understood that the embodiments described above are exemplary in all aspects and are not limitative. The scope of the invention is represented by Claims to be described later rather than the detailed description, and it should be interpreted that all modifications or modified forms derived from the meaning, scope, and equivalent concepts of Claims are included in the scope of the invention.

REFERENCE SIGNS LIST

100, 200: STRAIN SENSOR
110: FIRST ELASTIC LAYER
120: CONDUCTIVE LAYER
130: SECOND ELASTIC LAYER
131, 211: RIDGE
132, 212: VALLEY

What is claimed is:

1. A strain sensor comprising::
   a body including an elastic layer and a conductive layer;
   wherein the conductive layer includes a conductive material configured to change in resistance or capacitance based on strain,
   wherein a first surface of the elastic layer is provided with unevenness,
   wherein the conductive layer is formed on a second surface of the elastic layer, and
   wherein the body is configured such that strain imposed on the first surface in a side direction of the elastic layer concentrates strain in valleys of the first surface and generates a change in resistance or capacitance of the conductive layer.

2. A strain sensor comprising:
a body including a first elastic layer and second elastic layer, wherein a conductive layer is disposed between the first elastic layer and the second elastic layer;
wherein the conductive layer includes a conductive material configured to change in resistance or capacitance based on strain; and
wherein an exposed surface of the second elastic layer is provided with unevenness, and
wherein the body is configured such that strain imposed on the uneven surface in a side direction of the second elastic layer concentrates strain in valleys of the second elastic layer and generates a change in resistance or capacitance of the conductive layer.

3. A strain sensor comprising:
an elastic body having a conductive material uniformly distributed therein, the conductive material configured to change in resistance or capacitance based on strain;
wherein the elastic body has a first surface, a second surface subtending the first surface, a third surface, and a fourth surface subtending the third surface,
wherein the first surface is provided with unevenness,
wherein the third surface is provided with a first electrode and the fourth surface is provided with a second electrode, and
wherein the elastic body is configured such that when strain is imposed on the first surface in a side direction of the first surface, the strain is concentrated in valleys of the first surface and a change in resistance or capacitance is detected between the first and second electrodes.

4. The strain sensor according to claim 1, wherein the unevenness includes ridges and valleys, and a ratio of ridge and valley in width is (width of valley):(width of ridge)=1:1 to 1:6.

5. The strain sensor according to claim 1, wherein the unevenness includes ridges and valleys, and a ratio of ridge and valley in height is (height of valley):(height of ridge)=1:4/3 to 1:3.

6. The strain sensor according to claim 1, wherein the elastic body comprises:
at least one of PDMS, epoxy, and Ecoflex.

7. The strain sensor according to claim 1, wherein the conductive material comprises:
at least one of silver nanowire, carbon nanotube, carbon black, graphene, and metal powder.

8. The strain sensor according to claim 2, wherein the unevenness includes ridges and valleys, and a ratio of ridge and valley in width is (width of valley):(width of ridge)=1:1 to 1:6.

9. The strain sensor according to claim 2, wherein the unevenness includes ridges and valleys, and a ratio of ridge and valley in height is (height of valley):(height of ridge)=1:4/3 to 1:3.

10. The strain sensor according to claim 2, wherein the elastic body comprises:
at least one of PDMS, epoxy, and Ecoflex.

11. The strain sensor according to claim 3, wherein the elastic body comprises:
at least one of PDMS, epoxy, and Ecoflex.

12. The strain sensor according to claim 2, wherein the conductive material comprises:
at least one of silver nanowire, carbon nanotube, carbon black, graphene, and metal powder.

13. The strain sensor according to claim 3, wherein the conductive material comprises:
at least one of silver nanowire, carbon nanotube, carbon black, graphene, and metal powder.

* * * * *